US007998302B2

(12) United States Patent
Austermeier

(10) Patent No.: US 7,998,302 B2
(45) Date of Patent: Aug. 16, 2011

(54) TRANSVERSE LANE LABELING METHOD AND LABELLER

(75) Inventor: Georg Austermeier, Hovelhof (DE)

(73) Assignee: Multivac Marking & Inspection GmbH & Co. KG (DE)

( * ) Notice: Subject to any disclaimer, the term of this patent is extended or adjusted under 35 U.S.C. 154(b) by 437 days.

(21) Appl. No.: 12/118,846

(22) Filed: May 12, 2008

(65) Prior Publication Data

US 2009/0199961 A1 Aug. 13, 2009

(30) Foreign Application Priority Data

Feb. 7, 2008 (DE) ........................ 10 2008 007 890

(51) Int. Cl.
*B29C 65/48* (2006.01)
*B32B 37/00* (2006.01)
*B32B 38/00* (2006.01)
*B32B 43/00* (2006.01)

(52) U.S. Cl. ......... 156/249; 156/DIG. 28; 156/DIG. 37; 156/DIG. 42

(58) Field of Classification Search .................. 156/229, 156/230, 247, 249, 389, 391, 538–542, 556, 156/557, 566, DIG. 28, DIG. 37, DIG. 42; 269/21; 492/30, 37
See application file for complete search history.

(56) References Cited

U.S. PATENT DOCUMENTS 4,046,613 A 9/1977 Kucheck et al.
6,868,887 B2 * 3/2005 Harte et al. .................. 156/539
7,318,877 B2 * 1/2008 Harte ........................... 156/249

FOREIGN PATENT DOCUMENTS

DE 27 08 353 A1 9/1977
DE 102 28 243 A1 1/2004
JP 63062421 A 2/1987

OTHER PUBLICATIONS

German Office Action Dated Oct. 22, 2010, Application No. 10 2008007890.5-27—Applicant MR Etikettieffechnik GmbH & Co, KG, 4 Pages.

* cited by examiner

*Primary Examiner* — Philip C Tucker
*Assistant Examiner* — Sing P Chan
(74) *Attorney, Agent, or Firm* — Brooks Kushman P.C.

(57) ABSTRACT

A method for applying labels on articles, which are guided in parallel lanes, for which in each case a row of labels is dispensed by a label dispenser from a backing, taken up by a transfer path guided transversely over the lanes and transferred in a transfer step onto the articles, the transfers step comprising the moving of a lifting tool, extending along a section of the transfer path onto article lanes for pressing the labels onto the articles and the return of the lifting tool into its starting position. The dispensed labels are taken up at a point of the transfer path, which is at a distance from the lifting tool, and the dispending of a row of labels is commenced before the step of transferring a previous row of labels is concluded.

14 Claims, 4 Drawing Sheets

TRANSVERSE LANE LABELING METHOD AND LABELLER

BACKGROUND OF THE INVENTION

The present invention relates to a method for the multi-lane and multi-row application of labels on articles, such as packaging or the like, which are guided in parallel lanes.

Transverse lane labeling systems are known, for which the articles such as thermoformed packaging or the like, guided in parallel lanes, are labeled with the help of a transfer device, which extends transversely over the article lanes. For this purpose, the labels are, first of all, dispensed on a transfer path, such as an endless transporting belt and transferred to a transferring device. This comprises a lifting tool, which extends along a section of the length of the transfer path and can be lowered onto the articles. At the same time, a row of labels on the transfer path is taken hold of and pressed against the articles. After the labels are pressed on, the lifting tool can return once again back into its starting position. This cyclic movement of the lifting tool against the articles and back again is also referred to in the following as the transfer step.

The German Offenlegungsschrift DE 102 28 243 A1 of the Applicant shows, for example, a traverse lane labeler, the transfer device of which comprises a suction box, over which the transfer path runs, so that the non-adhesive side of the labels can be held by suction at the underside of the suction box. In this case, the lifting tool is formed by a sliding plate arrangement, which can be moved out of the suction box and presses the labels, held by suction, against the articles. The speed of the transfer path and of the backing film, from which the labels are dispensed, can be matched to one another in such a manner, that the labels, taken up on the transfer path, are at the desired distances from one another, which correspond to the lateral distances between the article lanes.

If the articles are to be labeled on the underside, the transfer path and the transfer device must also be disposed underneath the article lane. With that, parts of the labeler requiring maintenance are in an area of the machine frame, to which access is difficult, so that the operation becomes more difficult. In particular, a new backing film of the label dispenser must be threaded into the dispenser edge at regular intervals. If too much time is required for this procedure, the downtime of the labeler is too high and leads to a loss in output. For conventional labelers, shifting the parts, which require service, to an area of the machine, which is more accessible, depends on the construction and is not readily possible.

SUMMARY OF THE INVENTION

It is therefore an object of the present invention to provide a labeling method of the type named above, by means of which the operation and maintenance of the above-described labelers is facilitated without suffering a loss of performance. It is a further object to create an appropriate labeler, which is suitable for carrying out such a method.

For the inventive method, the dispensed labels are taken up at a point of the transfer path, which is at a distance from the lifting tool. For this purpose, the transfer path has a free section, which cannot be taken hold of by the lifting tool and which extends upstream from the lifting tool with respect to the running direction of the lane. The labels are transported from the dispensing edge to the lifting tool on this free section. The dispensing edge of the label dispenser may therefore be disposed remote from the lifting tool, for example, in a part; which is outside of the machine frame and is readily accessible. Threading the backing film around the dispensing edge is made easier thereby.

So that there is no loss of performance during the operation of the labeler due to the additional transporting path between the dispensing edge and the lifting tool, the dispensing of the leading label of a row of labels commences already during the transfer step, that is, even before the lifting tool, after it has pressed a preceding row of labels against the articles, has returned back to its starting position. Accordingly, the time, which the lifting tool requires for its movement, can be utilized for transporting subsequent labels to the lifting tool. Ideally, then, no additional time is used in the labeling cycle for the transporting path. The time, at which the dispensing of a row of labels is commenced, is determined here as a function of the transporting path of the labels from the point, at which they are taken up on the transfer path, until they reach the lifting tool, of the lane speed of the transfer path and of the lifting speed of the lifting tool.

Accordingly, the inventive method provides the possibility of shifting the dispensing edge to an easily accessible point of the labeler without lengthening the time required for the application of a row of labels. The additional transporting path is compensated for by selecting the dispensing time early as a function of the speed or of the actual position of the lifting tool. It is even possible to commence the dispensing of a new row while the lifting device with a prior row of labels is still on the way in the direction of the articles. If the lifting time of the lifting tool changes due to a rise in temperature, a changed contacting pressure or the like, the dispensing time can be adapted correspondingly.

In a preferred embodiment of this method, the time of commencing the dispensing of a row of labels is optimized in such a manner, that the period that elapses from the time that the lifting tool returns to its starting position until the leading label of the row of labels reaches the lifting tool, is minimized.

In this case, the new row of labels reaches the lifting tool at the very time when the latter is available for a new transfer step. The time, required for moving the lifting tool, accordingly is used optimally for transporting the labels from the dispensing edge to the lifting tool.

In a further preferred embodiment of the method, the rate of movement of the lifting tool is measured and the time of commencing the dispensing of a row of labels is set as a function of a prior measurement of the speed, with which the lifting tool is moving.

This method takes into account any change in the speed of the lifting tool. In this case, the time, at which the labels are dispensed, is adapted dynamically to the operation of the labeler.

Preferably, the backing film and the transfer path are driven continuously and their driven speeds behave like the center-to center distances between the labels on the backing film and the average lateral center-to center distances between the article lanes.

A labeler for carrying out the inventive method is claimed by claim 5. The dependent claims 6 to 11 relate to preferred embodiments of such a labeler.

BRIEF DESCRIPTION OF THE DRAWINGS

In the following an example of the present invention is explained in greater detail by means of the drawing, in which.

DETAILED DESCRIPTION

Figure 1:
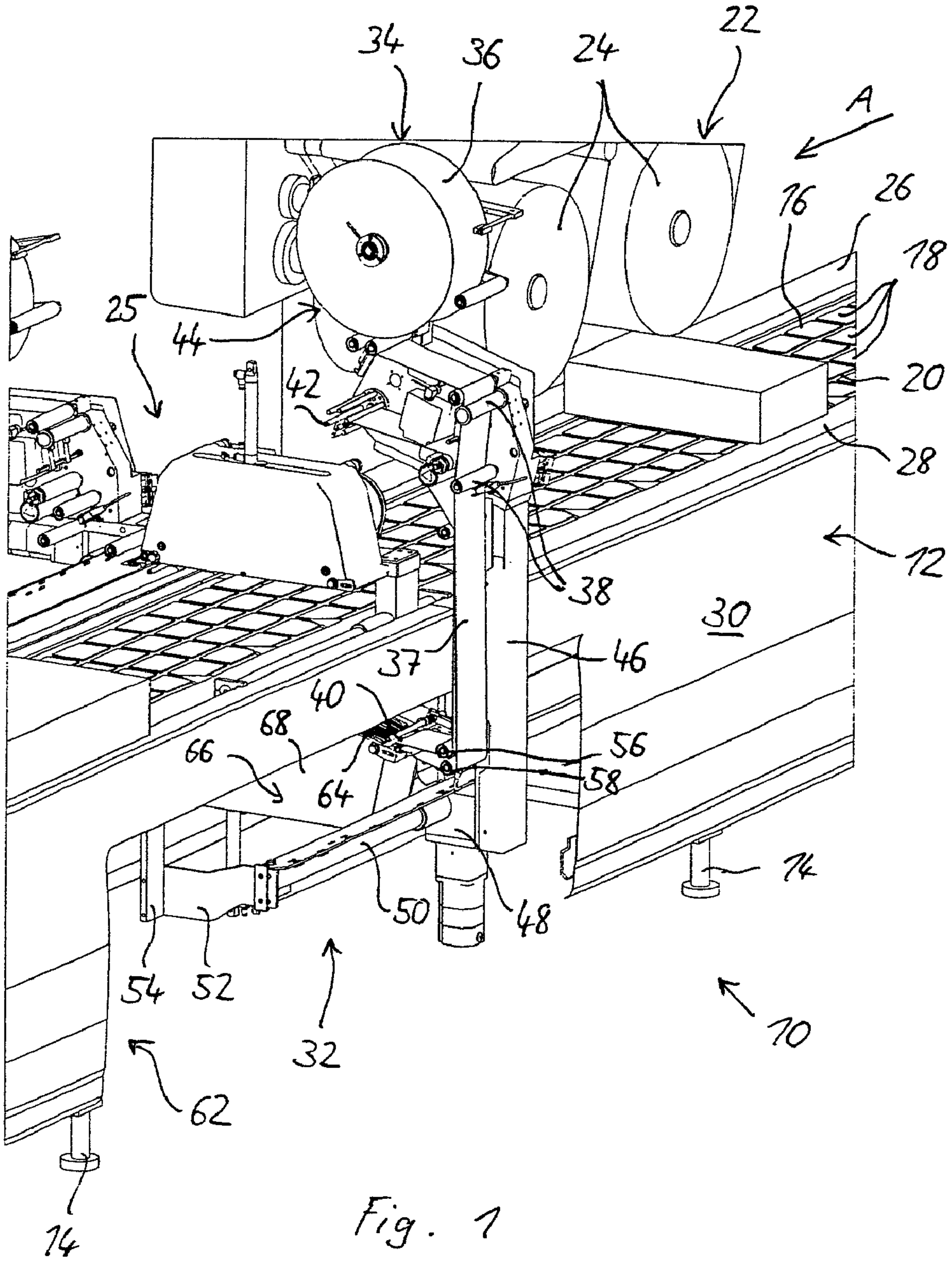
FIG. 1 is a perspective partial representation of an embodiment of a labeler for carrying out the inventive method.

The labeler 10, shown in FIG. 1, comprises a machine frame 12, which rests on legs 14 and in which articles 16, such as thermoformed packages or the like are transported in parallel lanes 18 in a longitudinal direction A of the machine frame 12. In FIG. 1, four lanes 18 of articles 16 can be identified, which hang together by way of a packing film 20 for closing off the packages, so that the articles 16 form a composite. A second packaging film can be applied by a unit 22, which may comprise packaging film dispensing rolls 24, guide rollers and the like and further parts for unwinding the film and welding the latter to the articles 16. Such units 22 are known and are therefore not described in greater detail here. Furthermore, a conventional labeling unit 25, such as the one known, for example, from the DE 102 28 243 A1, is mounted above the article lanes 18.

The machine frame 12 comprises two parallel, horizontal longitudinal carriers 26, 28, between which the article lanes 18 run. Lateral lining plates 30, the upper edges of which are mounted to the machine frame 12 and which extend downward as far as the vicinity of the ground, are mounted at the respective longitudinal carriers 26, 28.

Downstream from the unit 22 for applying the packaging film 20, a further labeling unit 32 is disposed, which applies the labels, the details of which are not shown in FIG. 1, to the underside of the articles 16. For this purpose, the labeling unit 32 comprises a label dispenser 34, which is disposed to the side of the article lanes 18. The label dispenser 34 comprises, in the usual manner, a supply roll 36, from which a backing film 37 is passed over a number of guide rollers, and a dispensing edge 40 to a reel 42, onto which the empty backing film 37 is rolled. This principle of functioning is also already known. For the construction existing here, the supply roll 36, the reel 42 as well as some of the guide rollers 38 are mounted at a head 44, which is above the article lanes 18 and carried by a vertical arm 46, which is in front of the lining plates 30 laterally outside of the machine frame 12. At its lower end, the arm 46 is held with the help of a slide block 48 on a horizontal guide rail 50, which is formed by a bar with a round cross section. This bar 50 extends parallel to the longitudinal carriers 26, 28 underneath the lanes and is held at its ends between two flanges 52, which, in turn, are connected by struts 54, protruding vertically at the flanges 52, with one of the longitudinal carriers 28. Secure fastening of the bar 50 at the two fastening points of the longitudinal carrier 28 is ensured in this way and the arm 46, which carries the head 44 of the label dispenser 34, can be shifted along the bar 50.

At its lower region above the slide block 48, the arm 46 of the label dispenser 34 carries two further guide rolls 56, 58 as well as the dispensing edge 40. The backing film 37 accordingly is guided from the supply roll 36 over the guide rolls 38 at the head 44 downward along the arm 46 over the guide roll 58, over the dispensing edge 40 and, from there, upward around guide roll 56 in the direction of the head 44, in order to be wound on the reel 42. Accordingly, the dispensing edge 40 is disposed somewhat below the lateral longitudinal carrier 28 in a region of the machine frame 12, which is easily accessible from the outside. In particular, for threading the backing film 37 over the guide rolls 56, 58 onto the dispensing edge 40, it is not necessary to grasp far into the lower region of the machine frame 12 underneath the article lanes 18, so that the operation of the labeling dispenser 34 is facilitated. A cut-out 62 in the lateral lining plates 30 ensures good accessibility to the parts of the labeling unit 32, which are disposed laterally below the article lanes 18. These furthermore comprise a transporting lane 64 for accommodating the dispensed labels as well as a transfer device 66, which transfers the labels from the transfer path lane 64 to the underside of the articles 16. This is to be described in greater detail below. Within the scope of the present invention, the dispensing edge 40 may even be shifted into a region laterally on the outside of the machine frame 12, so that the dispensed labels are transported through the cut-out 62 to the transfer device 66 underneath the article lanes 18.

Figure 2:
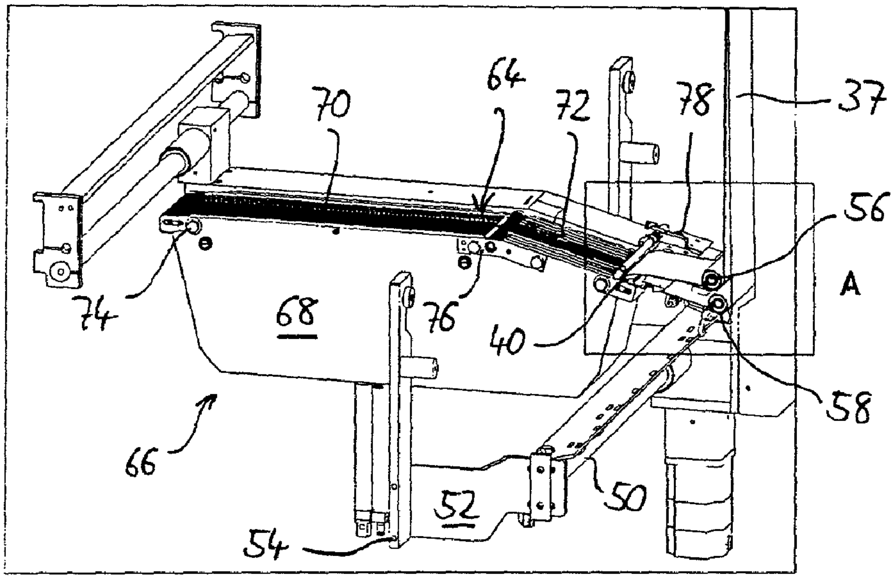
FIG. 2 is a perspective representation of essential elements of the labeler of FIG. 1, especially of the transfer device and of the transfer path.
Figure 3:
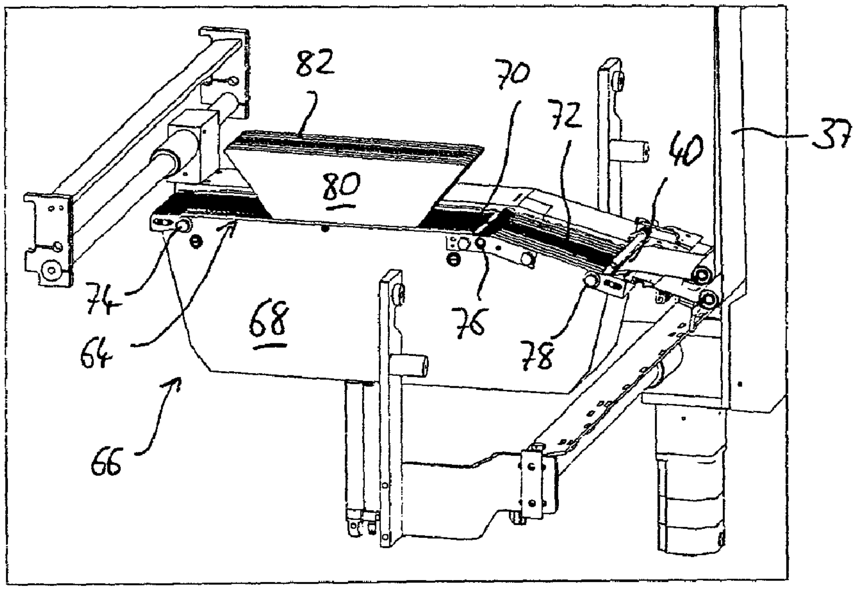
FIG. 3 shows a labeler part of FIG. 2 in a different operating position.

As can be seen in greater detail in FIGS. 2 and 3, the transfer device 66 comprises a suction box 68, in which a reduced pressure is produced. The transfer path 64, which is formed by two mutually adjoining endless belts 70, 72, passes over the upper side of the suction box 68. Each of these endless belts 70, 72 is formed by two parallel strip-shaped belts. Air can be aspirated into the suction box 68 through the spaces between these endless belts 70, 72, so that labels, which are taken up by the transfer path 64, can be held by suction at the transfer path 64. These labels then lie on the respective top strand of the endless belts 70 or 72.

The endless conveyor belt 70 on the left in FIG. 2 runs over a left free-running roll 74 as well as over a right driven roll 76, over which also the right endless conveyor belt 72 is passed with its belt, so that both endless conveyor belts 70, 72 can be rotated by the joint drive shaft 76. The right endless conveyor belt 72 finally also runs over a further roll 78 at the right end of the suction box 68. Whereas the left endless conveyor belt 70 extends horizontally in the transverse direction under the article lanes 18, the other endless conveyor belt 72 runs slightly downward with respect to the horizontal.

Deviating from the embodiment introduced here, it is possible to form the transfer path 64 by a single endless conveyor belt.

The transfer device 66 furthermore comprises a lifting tool for transferring labels, which are held by suction at the transfer path 64, onto the articles 16. This lifting tool is formed by a set of slide plates 80, which in FIG. 2 are recessed completely into the suction box 68 and are shown in their fully extended position in FIG. 3. In their initial position in FIG. 2, the parallel, horizontal upper edges 82 (FIG. 3) lie directly beneath the upper surface of the transfer path 64, so that the labels can be transported without hindrance on the transfer path 64 over the slide plates 80.

After the labels have been positioned by the transfer path 64 over the slide plates 80, the latter can be raised through the interstices between the belts of the conveyor belt 70, so that they can take hold of the labels. In the completely extended position in FIG. 3, the labels are pressed against the underside of the articles 16. The upper edges 82 of the slide plates 80 are dimensioned, so that they extend approximately over the whole length of the conveyor belt 70 extending parallel under the article lanes 18. Accordingly, during the lifting motion of the slide plate set 80, labels on the slightly inclined transfer path 72 are not taken hold of by the upper edges 82.

Figure 4:
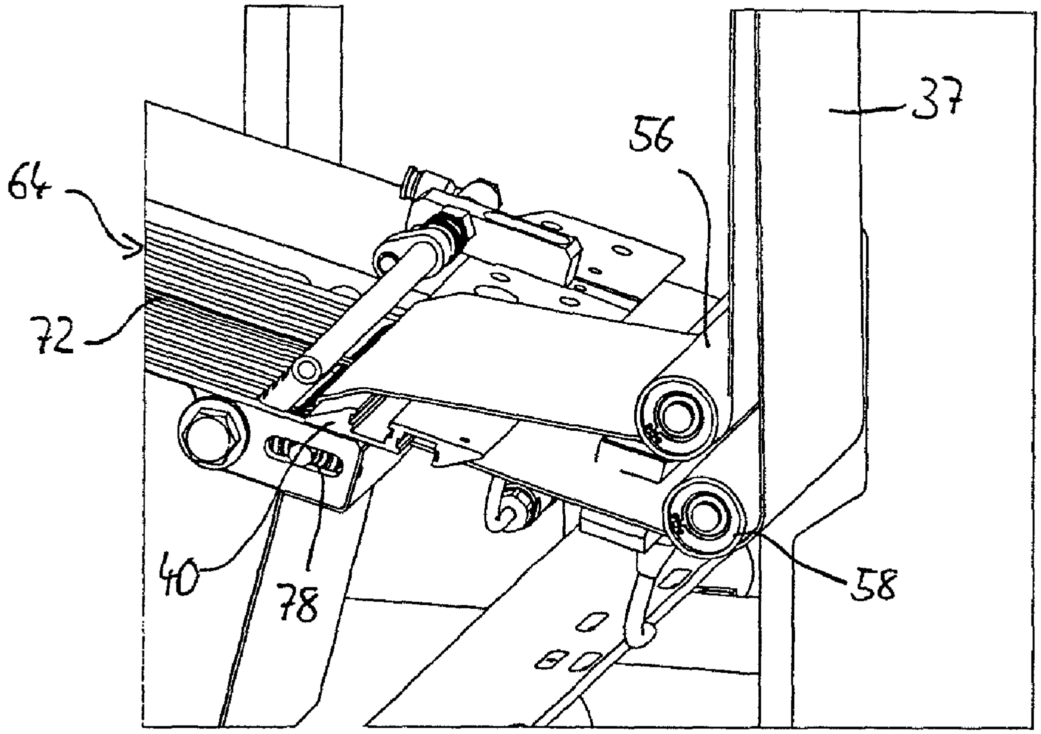
FIG. 4 shows an enlargement of a section A of FIG. 2 and FIGS. 5 to 7 show diagrammatic representations for explaining the inventive labeling method.

It can furthermore be seen clearly in FIGS. 2 and 3 as well as in the enlargement in FIG. 4 that the dispensing edge 40 is disposed remote from the slide plates 80 at the right end of the transfer path 64, which end is formed by the right end of the slightly inclined conveyor belt 72. The labels, dispensed from the backing film, accordingly are taken up at the right end of the transfer path 64, conveyed on the transfer path 72 in the direction of the first conveyor belt 70, onto which they are transferred until a row of labels is available on the section of the transfer path 64, which is disposed above the slide plates 80, for transfer to the articles 16. The transfer is accomplished by raising the slide plates 80, the upper edges 82 of the plates 80 taking hold of the labels. After the labels are pressed against the articles 16, the slide plates 80 are returned to their starting position in FIG. 2. During such a transfer step, which includes the upwards and downwards movement of the slide plates 80, further labels can already be taken up at the upstream end of the transfer path 64 and transported to the slide plates over the free section of the transfer path 64, which cannot be taken hold of by the slide plates 80. This process can be controlled in such a manner, that the subsequent labels reach the section of the transfer path 64, which can be taken hold of by the slide plates 80, when the slide plates 80 are once again in the retracted position in FIG. 2. In this way, it is avoided that additional time is employed for transporting the labels from the dispensing edge 40 to the slide plates 80, since the dispensing of a subsequent roll of labels already takes place during the transfer of a preceding row of labels to the articles 16.

Figure 5:
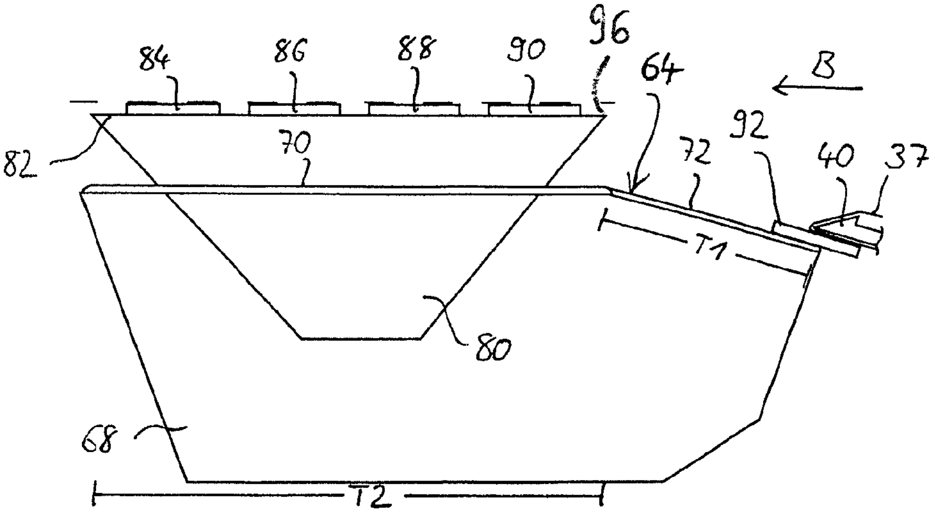
Figure 6:
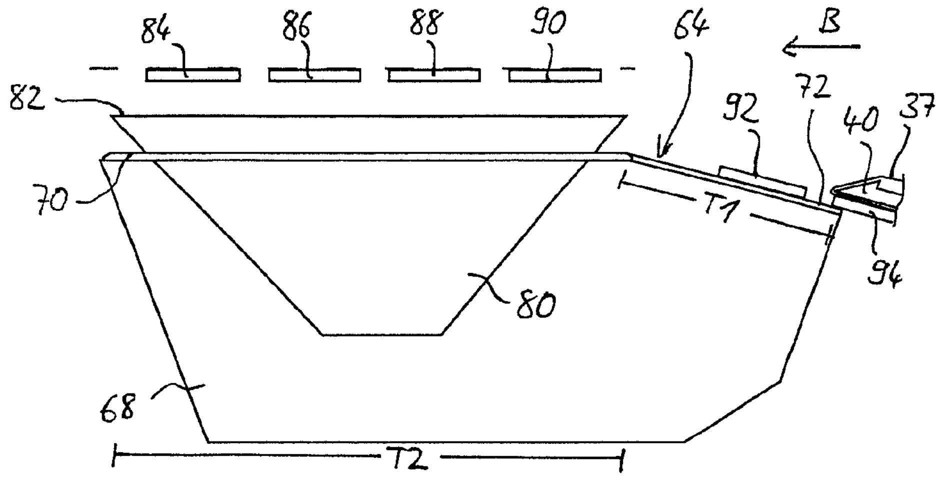
Figure 7:
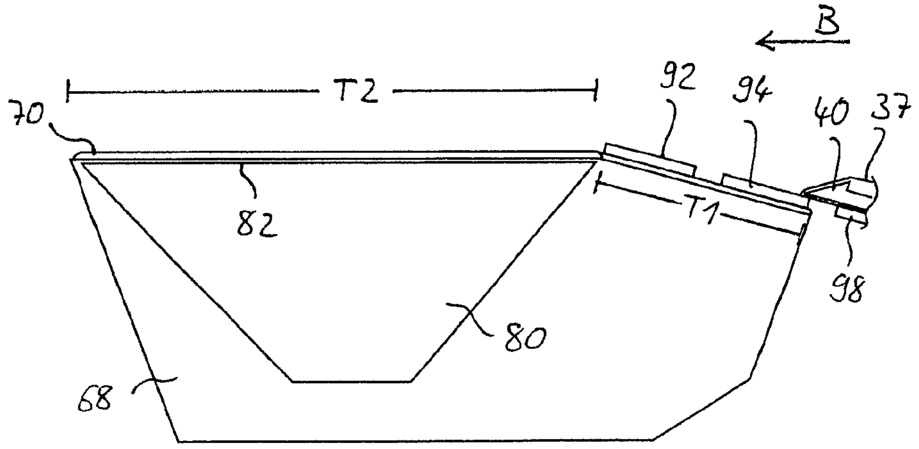

This process is to be explained in greater detail by means of the diagrammatic FIGS. 5 to 7.

FIGS. 5 to 7 show the suction box 68 in a diagrammatic side view. The transfer path 64, the transporting direction of which is indicated by an arrow B pointing to the left, extends at the upper side of the suction box 68. Within the suction box 68, the set of slide plates 80 are shown movable upward and downward and in different lifting positions in the Figures. The completely extended upper position of the slide plates 80 is shown in FIG. 5. On the other hand, FIG. 7 represents the retracted starting position of the plates 80 of FIG. 2, in which the upper edges 82 of the slide plates 80 are located immediately below the upper side of the transfer path 64 or terminate with this surface. It is important that, in this position, the labels 84, 86, 88, 90, conveyed on the transfer path 64, can be conveyed without interference over the set of slide plates 80, without being impeded by the slide plates 80.

As already mentioned, the transfer of a row of labels from the transfer path 64 to the article 16 takes place in a transfers step, in which the set of slide plates 80, as a lifting tool, is extended from its starting position in FIG. 7 against the articles 16 for pressing the labels against these and subsequently returns once again to its starting position. FIG. 5 shows the set of slide plates 80 in its fully extended contacting position, that is, still before the conclusion of the transfers step. At this time, the dispensing of a subsequent row of labels from the backing film 37 to the free right end of the transfer path 64 can already be commenced. In FIG. 5, four labels 84, 86, 88, 90 of a row of labels are pressed by the set of slide plates 80 against the articles 16. At the same time, at the dispensing edge 40, the first label 92 of a subsequent row of labels, which is to be transferred, is dispensed onto the free end of the transfer path 64, which cannot be taken hold of by the set of slide plates 80. During the dispensing, the transfer path 64, driven by the two conveyor belts 70, 72, moves in its running direction B and transports the dispensed label 92 in the direction of the slide plates 80. At the same time, the movement of the transfer path 64 and of the backing film 37 can be controlled in a suitable manner so that a desired distance between labels on the transfer path 64 is achieved. For example, the backing film 37 and the transfer path 64 can be driven continuously, their driving speeds being in the same proportion as the distances between the centers of the labels on the backing film 37 and the center-to-center spacing of the article lanes 18, as described in the German patent 102 28 243 of the Applicant. Alternatively, the transfer path 64 can also be driven intermittently and, for the dispensing process, in each case moved forward and held in the next taking-up position.

During a subsequent return movement of the slide plates 80 in the direction of the starting position, that is, in the downward direction, the dispensed label 92 was transported already in the direction of the slide plates 80 and a subsequent label 94 is placed on the transfer path 64. The time, at which the dispensing of a new row of labels is commenced, can be selected as a function of the transporting path of the labels from the point, at which they have taken up on the transfer path 64, until they reach the slide plates 80, as a function of the speed of the transfer path 64 and as a function of the speed of movement of the slide plates 80. The transport path of the labels is determined here by the distance between the dispensing edge 40 and the right edge 96 of the slide plates 80, which is the first edge to be reached in the running direction B of the transfer path 64. In FIG. 7, the front edge of the next row of labels 92, 94, 98 has just arrived at the section of the transfer path 64, which can be taken hold of by the upper edges 82 of the slide plates 80. By further conveying on the transfer path 64, the subsequent labels 92, 94, 98 accordingly are positioned over the slide plates 80 and can be pressed by the upward motion of the slide plates 80 against the articles 16, as shown in FIG. 5.

This procedure accordingly can be summarized as follows. While a first row of labels 84, 86, 88, 90 is being conveyed in a section T2 of the transfer path 64, over the length of which the upper edges 82 of the slide plates 80 extend, this row of labels 84, 86, 88, 90 is transferred in a transfer step to the articles 16, in that the slide plates 80 are moved against the articles 16. This transfer step furthermore comprises the return motion of the slide plates 80 into their starting position in FIG. 7. During this return motion or already during the upwards motion of the slide plates 80, the dispensing of a subsequent row of labels 92, 94, 98 onto the free section T1 of the transfer path 64 commences, the transfer path 64 extending, with respect to the running direction B of the transfer path 64, downstream of the slide plates 80. In this free transfer path section T1, the labels can be conveyed without interference in the direction of the slide plates 80 even during the upward and downward motions of the slide plates 80. The starting time of the dispensing of the subsequent row of labels 92, 94, 98 can be optimized so as to minimize the interval between the time that the slide plates 80 return to their starting position (FIG. 6) and the leading label 92 of the new row of labels 92, 94, 98 reaches the lane section T2, traversed by the slide plates 80. In other words, the new row of labels 92, 94, 98 is conveyed over the slide plates 80 at the very moment, in which the slide plates 80 have just once again reached their starting position. In this way, no time is lost during the conveying of the labels from the dispensing edge 40 to the slide plates 80; instead, at least a portion of the time, required for the transfers step, is utilized for the conveying.

It is therefore possible to increase the distance between the dispensing edge 40 and the slide plates 80 without lengthening the labeling time and without the loss of performance associated with such a lengthening. Accordingly, the dispensing edge 40 can be shifted to a point of the labeler, which is easily reached by the operating personnel. This point does not have to be directly on the slide plates 80 and, instead, may be disposed at a distance from the latter. The shifting of the dispensing edge 40 to a point at a distance from the lifting tool therefore becomes effectively possible only by the inventive control of the dispensing process.

Since the operating conditions of the labeler may change, the lifting speed of the lifting tool advantageously is measured and the starting time of the ammencement of the dispensing of a new row of labels 92, 94, 98 can be adjusted as a function of the preceding lifting speed measurement of the slide plates 80. Accordingly, the time of dispensing the labels on the free section T1 of the transfer path 64 is selected optimally also during the operation of the labeler. For this purpose, the inventive labeler comprises a suitable control device as well as measurement devices, which measure, aside from the speed of movement of the slide plates 80, also the speed of the transfer path 64. Optionally, the basic position of the slide plates 80 can also be determined.

What is claimed is:

1. A method for the multi-lane and multi-row application of labels on articles which are guided in parallel article lanes, the method comprising the steps of:

dispensing a row of labels by a label dispenser, disposed at a side of the lanes, from a backing such that the dispensed row of labels is taken up by a transfer path guided transversely relative to the lanes; and transferring the dispensed row of labels by a transfer device from the transfer path to the articles, the step of transferring comprising the steps of:

moving a lifting tool extending along a section of the transfer path onto the article lanes for pressing the labels onto the articles; and returning the lifting tool into a starting position thereof;

wherein the dispensed labels are taken up at one point of the transfer path, which is at a distance from the lifting tool, and the step of dispensing of a row of labels is commenced before the step of transferring a previous row of labels is concluded, with the time of starting the dispensing of a row of labels being determined as a function of:

a transporting path of the labels from a taking-up point on the transfer path up to a point at which the labels reach the lifting tool, speed of the transfer path, and speed of the lifting tool.

2. The method of claim 1, further comprising the step of optimizing the time at which the dispensing of a row of labels is commenced, so that the time between the return of the lifting tool into its starting position and the arrival of a leading label of the row of labels at the lifting tool is minimized.

3. The method of claim 1, further comprising the steps of:

measuring the speed of the lifting tool and adjusting the time at which the dispensing of a row of labels is commenced as a function of a preceding measurement of the speed of the lifting tool.

4. The method of claim 1, further comprising the step of continuously driving the backing and the transfer path with driving speeds thereof in the same ratio as center-to-center distances of the labels on the backing and lateral center-to-center distances of the article lanes.

5. The method of claim 1 wherein the transfer path comprises first and second belt arrangements positioned end to end, and wherein the method further comprises moving the row of labels with the first belt arrangement to the second belt arrangement.

6. The method of claim 5 wherein the step of dispensing a row of labels comprises dispensing the row of labels onto the first belt arrangement.

7. The method of claim 6 wherein the first belt arrangement is oriented at an angle with respect to the second belt arrangement such the that first and second belt arrangements are not coplanar.

8. A method for multi-lane application of labels onto articles that are guided in parallel article lanes, the method comprising the steps of:

a) dispensing a row of labels by a label dispenser from a backing and onto a transfer path;

b) transferring the dispensed row of labels from the transfer path to the articles, wherein step b) comprises moving a lifting tool, which extends along a section of the transfer path, relative to the article lanes to press the row of labels onto the articles, and returning the lifting tool to a starting position thereof; and c) repeating steps a) and b) such that step a) is commenced before the step of returning the lifting tool is concluded in connection with step b) for the preceding row of labels.

9. The method of claim 8 further comprising optimizing time at which the dispensing of a row of labels is commenced, so that time between the return of the lifting tool into its starting position and arrival of a leading label of the row of labels at the lifting tool is minimized.

10. The method of claim 8 further comprising measuring speed of the lifting tool, and adjusting a time at which the dispensing of a row of labels is commenced as a function of a preceding measurement of the speed of the lifting tool.

11. The method of claim 8 further comprising continuously driving the backing and the transfer path with driving speeds thereof in the same ratio as center-to-center distances of the labels on the backing and lateral center-to-center distances of the article lanes.

12. The method of claim 8 wherein the transfer path comprises first and second belt arrangements positioned end to end, and wherein the method further comprises moving the row of labels with the first belt arrangement to the second belt arrangement.

13. The method of claim 12 wherein step a) comprises dispensing the row of labels onto the first belt arrangement.

14. The method of claim 13 wherein the first belt arrangement is oriented at an angle with respect to the second belt arrangement such the that first and second belt arrangements are not coplanar.

* * * * *